US006247243B1

(12) United States Patent
Check

(10) Patent No.: US 6,247,243 B1
(45) Date of Patent: Jun. 19, 2001

(54) TURF INSPECTION INSTRUMENT AND METHOD

(76) Inventor: Joseph M. Check, 4420 Churchill St., Shoreview, MN (US) 55126

( * ) Notice: Subject to any disclaimer, the term of this patent is extended or adjusted under 35 U.S.C. 154(b) by 0 days.

(21) Appl. No.: 09/336,907

(22) Filed: Jun. 21, 1999

(51) Int. Cl.[7] .............................. G01B 5/00; G01B 5/06
(52) U.S. Cl. ........................ 33/783; 33/1 H; 33/1 BB
(58) Field of Search ............................ 33/1 H, 1 BB, 33/227, 228, 286, 289, 274, 700, 701, 501, 521, 783, 275 R, 276, 277, 278, 279, 280, 293, 294; 359/438

(56) References Cited

U.S. PATENT DOCUMENTS

| | | | | |
|---|---|---|---|---|
| 854,916 | * | 5/1907 | Stoner | 33/1 H |
| 2,981,000 | * | 4/1961 | Long | 33/1 H |
| 3,800,426 | * | 4/1974 | Nakamura | 33/368 |
| 3,890,717 | * | 6/1975 | Haun | 33/413 |
| 3,967,381 | * | 7/1976 | Chesbro | 33/1 H |
| 3,973,327 | * | 8/1976 | Cardinale | 33/494 |
| 4,228,588 | * | 10/1980 | Horton, Jr. | 33/1 H |
| 4,763,419 | * | 8/1988 | Whitman, III | 33/272 |
| 4,916,823 | * | 4/1990 | Kunze | 33/521 |
| 4,993,160 | * | 2/1991 | Fraley | 33/286 |
| 5,325,798 | * | 7/1994 | Nowell et al. | 111/99 |
| 5,450,678 | * | 9/1995 | Check | 33/833 |

* cited by examiner

Primary Examiner—Jacob K. Ackun, Jr.
Assistant Examiner—Faye Francis
(74) Attorney, Agent, or Firm—Nawrocki, Rooney & Silvertson, P.A.

(57) ABSTRACT

A turf inspection instrument offering an expandable depth of field and enhanced vertical scale for observing and assessing turf conditions is provided wherein the instrument includes an end wall having a gauge surface carrying graduated measuring indicia thereon, opposing longitudinal ends, and arms extending therefrom to form a substantially U-shaped frame having an open end opposite the end wall. The end wall further has a beveled bottom edge for satisfactory turf penetration. A selectively adjustable viewing assembly is carried by the frame (i.e., between the arms) substantially parallel to the end wall for movement with respect thereto. The viewing assembly includes a prism and arm engaging members adapted to support the prism moveably upon the arms, with the prism being tiltably received by the arm engaging members. A turnbuckle assembly connects the arms near the open end of the frame. Rotation of the link of the turnbuckle assembly permits binding of the selectively adjustable viewing assembly in a fixed position between the arms.

8 Claims, 1 Drawing Sheet

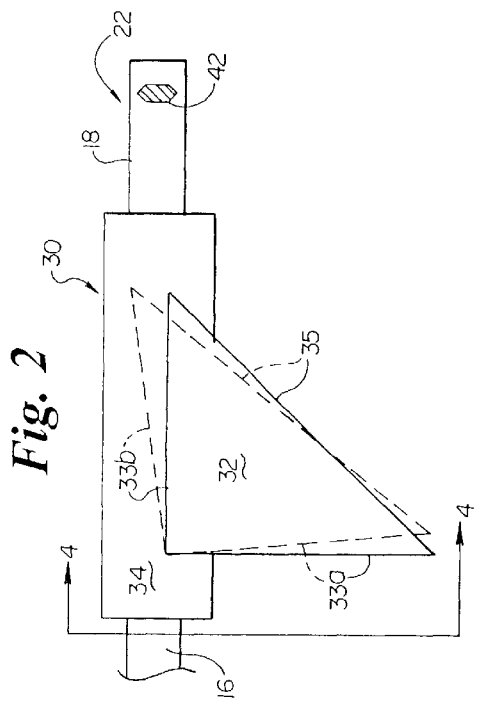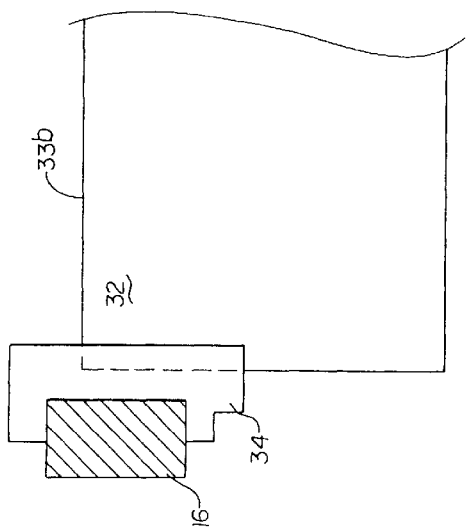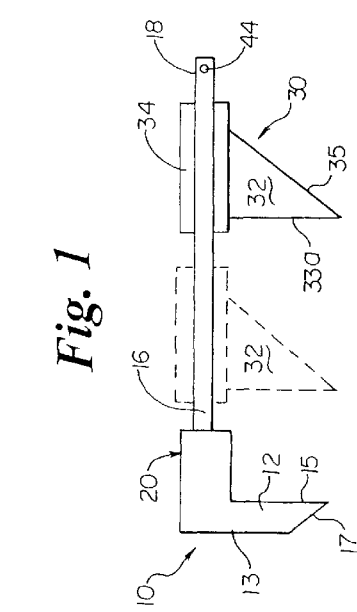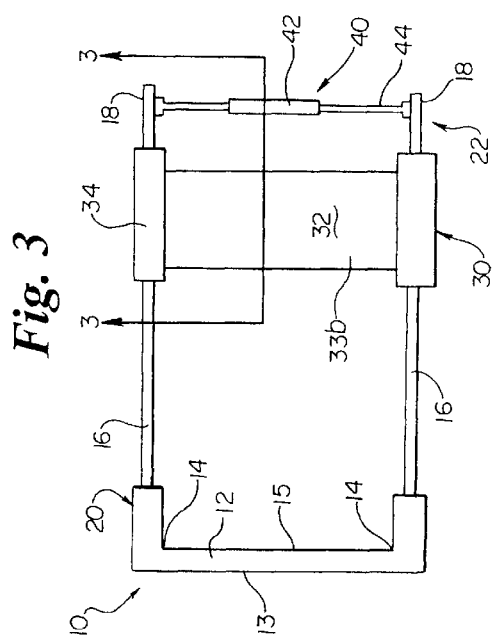

TURF INSPECTION INSTRUMENT AND METHOD

TECHNICAL FIELD

This invention relates to turf measuring and inspection instruments generally, and more particularly to a turf inspection and measuring instrument offering an expandable depth of field and enhanced vertical scale, and method for precise observation and assessment of turf conditions.

BACKGROUND OF INVENTION

The level of playability and aesthetic standards on golf course greens are ever increasing with the detection and analysis of turf cut imperfections being critical to ball play. It is not only important to perform such turf quality inspections, but it is of arguably greater importance to do so in a quick, consistent and repetitive manner so as to be in a position to make meaningful mowing adjustments and or modifications with minimal down-time.

Generally, turf imperfections take the form of turf height discrepancies. Seasonal growth patterns, increased density of grass, and normal build up all have an effect on the height of cut and measured turf height, and thereby the effective height of the turf cut (i.e., the difference between the bench setting and the measured height of cut). Furthermore, issues pertaining to the quality of cut (i.e., cut characteristics) often arise, necessitating close scrutiny of the turf along the top surface of the grass and downward along the leaf to the crown and below. Such quality of cut characteristics may include: stragglers, which create a shaggy cut which may be vulnerable to thatch build up; streaks, which appear as dark ridges caused by an uneven or damaged bed knife; disrupted grain usually resulting from improper cutting technique or inconsistent turf types; scalping, caused by cutter misadjustment or spongy turf; and mismatch, typically found where cutting units improperly overlap.

As grounds keepers are challenged to assess a multitude of cut turf characteristics and remediate surface imperfections, it is important to minimize down time for trial and error cutting tests after reel adjustment, loss of roller adjustment or replacement of bed knife of rollers etc. when imperfections are detected. Current turf measuring devices are limited to assessing turf height discrepancies over a fixed length or area. Furthermore, tools for inspecting the quality of the turf cut tend to be limited to horizontal views, views that are taken from a fixed vantage point.

It is desirable to have a turf inspection instrument that can measure turf height and height of cut while permitting quick, easy precise inspection of representative turf areas from the ground surface to the turf surface. It is further desirable to have an optical instrument which offers a horizontal view at the turf's maintained height and an expanded depth of field (i.e., expanded area of vision) so as to permit a more meaningful observation of the turf characteristics without the heretofore know field of vision restrictions or limitations. Furthermore, it is advantageous to provide an enhanced vertical view of the subject turf area below the turf's maintained height. It is also critical that measurements of turf height are in fact made in reference to the ground surface (i.e., the instrument should penetrate the turf as opposed to resting thereupon).

SUMMARY OF THE INVENTION

The present invention provides a turf inspection instrument having an expandable depth of field and enhanced vertical scale for observing and assessing turf conditions. The instrument includes an end wall having a gauge surface carrying graduated measuring indicia thereon, opposing longitudinal ends, and arms extending therefrom to form a substantially U-shaped frame having an open end opposite the end wall. The end wall further has a beveled bottom or otherwise sharp edge for satisfactory turf penetration so as to provide true, precise, and repeatable height of turf data with reference to the ground surface.

A selectively adjustable viewing assembly is carried by the frame (i.e., between the arms) substantially parallel to the end wall for movement with respect thereto. The viewing assembly includes a prism and arm engaging members adapted to support the prism moveably upon the arms, with the prism preferably being tiltably received by the arm engaging members. Selective adjustment of the selectively adjustable viewing assembly on the arms provides an expanded depth of field and thereby an expanded area of vision for turf inspection. Furthermore, tilting or angulation of the prism increases the vertical length of the object being viewed therethrough, namely the grass blades in the variable inspection area.

The prism is preferably a right angle prism configured such that the hypotenuse of the right triangle defined by the ends of the prism slopes upwardly away from the end wall of the instrument. Furthermore, the prism is ideally tiltable up to about 10 degrees such that the hypotenuse is more vertically positioned when so tilted (i.e., more parallel to the end wall).

A turnbuckle assembly connects the arms near the open end of the frame for securing the position of the selectively adjustable viewing assembly on the arms of the frame with respect to the end wall. Rotation of the link of the turnbuckle assembly permits binding of the selectively adjustable viewing assembly in a fixed position between the arms.

BRIEF DESCRIPTION OF THE DRAWINGS

FIG. 1 is side view of the turf inspection apparatus depicting the adjustability of the viewing apparatus.

FIG. 2 is a plan view of the turf inspection apparatus.

FIG. 3 is a sectional view along line 3—3 of FIG. 2 showing the adjustable viewing apparatus and depicting the tiltability of same.

FIG. 4 is a sectional view along line 4—4 of FIG. 3 showing the relationship between the adjustable viewing apparatus and an extending support arm.

DETAILED DESCRIPTION OF THE INVENTION

Referring now to FIGS. 1 & 2, the turf inspection instrument 10 preferably includes an end wall 12 having opposing longitudinal ends 14 and arms 16 extending therefrom to form a substantially U-shaped frame 20 having an open end 22 opposite the end wall 12. A selectively adjustable viewing assembly 30 is carried by the frame 20 (i.e., between the arms 16) for movement with respect to the end wall 12 and is in substantial parallel alignment with the end wall 12. A turnbuckle assembly 40 connects or links the free ends 18 of the frame arms 16 (i.e., the portion of the arms near the open end 22 of the frame 20) so as to permit binding of the selectively adjustable viewing assembly 30 in a fixed position therebetween.

The end wall 12 is substantially vertical and has an outer surface 13 and an inner gauge surface 15. The inner gauge surface 15 faces the selectively adjustable viewing assembly 30 and carries graduated measuring indicia for assessing turf height. The indicia comprises both english and metric scales, preferably inches and millimeters respectively. The english unit scale is preferably in increments of 0.05 inches, with a maximum measurable height capacity of 1.5 inches whereas the metric unit scale is in increments of 1 millimeter, with a maximum measurable height capacity of 40 millimeters.

The end wall 12 preferably has a beveled (i.e., sharp) bottom edge 17. This feature, in combination with the weight of the instrument, generally permits satisfactory turf penetration (i.e., eliminates instrument "float" on the turf) and thereby provides a critical ground surface point of reference for assessing turf height so as to produce more reliable and accurate measurements. Pressure may be applied to the instrument at the end wall, as the need arises, to increase penetration to improve accuracy assurance. The beveled bottom edge 17 is shown as sloping upward away from the inner gauge surface 15 (i.e., toward the outer surface 13), however this geometry is not critical inasmuch as a sharp edge however formed is advantageous.

Substantially parallel arms 16 extend from the longitudinal ends 14 of the end wall 12 serve to movably carry the selectively adjustable viewing assembly 30 relative to the end wall 12, more particularly the inner gauge surface 15 thereof. In addition to a pair of arms, a single arm is contemplated, as is other equivalent structure for moveably carrying the adjustable viewing assembly relative to the end wall (e.g., rods, couplers, rails, projections, bridges, etc.).

The selectively adjustable viewing assembly 30 generally includes a prism 32 and a prism carriage 34 (i.e., arm engaging members) which supports the prism 32 and permit its movement along the arms 16. The prism 32, preferably a right angle prism, has two perpendicular legs 33 (i.e., a substantially vertical leg 33A and a substantially horizontal leg 33B) and a hypotenuse 35. The prism 32 is configured with respect to the frame 20 so as to be parallel to the end wall 12 (FIG. 1), and to have its hypotenuse 35 sloping upward, away from the end wall 12 (FIG. 2).

Referring now to FIG. 3, the prism 32 of the adjustable viewing assembly 30 is preferably tiltably mounted with respect to the arm engaging members 34 for selective tilting. The prism 32 may be tilted from a vertical position (i.e., substantially vertical legs 33A being parallel with the end wall 12) up to about 10 degrees such that the right angle formed by the perpendicular legs 33 of the prism 32 moves in slight downward direction upon tilting. An alternate way of stating the tilt "direction" is that the hypotenuse 35 becomes more vertical (i.e., parallel to the end wall) upon selective tilt positioning of the prism 32 with respect to the carriage 34.

Referring now to FIG. 4, the arm engaging members 34 support the prism 32 on the arms 16 of the frame 20 and permit movement of the viewing assembly 30 with respect to the end wall 12, either directly thereupon as by sliding of the carriage 34 on the arms 16 or by movement thereupon indirectly, as for example by rolling via wheels etc. The arm engaging members 34 are preferably adapted to receive and tiltably retain the prism 32 therebetween, with known methods well suited for this purpose.

As best illustrated in FIG. 2, a turnbuckle assembly 40 preferably connects the arms 16 near the open end 22 of the frame 20 so as to allow binding (i.e., fixed positioning) of the adjustable viewing assembly 30 between the arms 16 of the frame 20. The turnbuckle assembly 40 permits tensioning of the frame arms 16 towards each other via rotation of the link 42 to thereby securely position the adjustable viewing assembly 30 therebetween. A quick one handed turn of the link 42 either permits or prohibits selective adjustment of the viewing assembly 30 with respect to the end wall 12. The rods or stays 44 of the turnbuckle assembly 40 define the distal limit of adjustability for the viewing assembly 30 from the end wall 12. In addition to turnbuckle assemblies and other equivalent devices (i.e., tensioning or otherwise), securing of the selectively adjustable viewing assembly in a fixed position may be accomplished, for instance, by a set screw positioned on the carriage to engage the viewing assembly carrying structure sufficiently to secure the selectively adjustable viewing assembly thereto.

The selectively adjustable viewing assembly 30 of the turf inspection instrument 10 permits an expandable depth of field via movement of the assembly 30 on the arms 16 of the frame 20 while allowing enhanced vertical scale by selective tilt positioning of the prism 32 relative to the supporting carriage 34. The right angle prism 32 of the viewing assembly 30, via its reflective properties, permits a view of the gauge surface 15 of the end wall 12 by peering down into the prism (i.e., the substantially horizontal leg) from above. The objects in the line of sight retain their three dimensional integrity as though they were being directly viewed (i.e., the depth of the field of vision remains unchanged). The overall turf height as well as the height of individual grass blades can be measured by visually comparison to the indicia carried by the gauge surface. Furthermore, by adjusting the prism 32 along the arms 16 of the frame 20, the field of vision is proportionally changed allowing for great versatility. The expanded depth of field creates an expanded area to observe the conditions of the surface and objects in the line of vision. The tilt feature for the prism allows a view down into the turf, along the length of individual leaves, down to the crown and even lower, in addition to a view along the top surface of the turf. The downward bias of the prism produces a better up/down view of the objects in the line of sight.

While this invention has been described with reference to an illustrative embodiment, this description is not intended to be construed in a limiting sense. Various modifications of the illustrative embodiment, as well as other embodiments of the invention, will be apparent to persons skilled in the art upon reference to this description. It is therefore contemplated that the appended claims will cover any such modifications or embodiments as followed in the true scope of the invention.

What is claimed is:

1. A turf inspection instrument comprising:
   (a) a frame having an open end and a closed end separated by parallel longitudinally extending arms;
   (b) an end wall depending downward from said closed end of said frame;
   (c) a selectively adjustable viewing assembly mounted between said extending arms, said selectively adjustable viewing assembly comprising a prism and arm engaging members adapted to slidingly engage said extending arms so as to provide an expandable depth of field for said turf inspection instrument, said prism being tiltably supported by said arm engaging members so as to offer an enhanced vertical scale for said turf inspection instrument; and
   (d) means for securing the position of said selectively adjustable viewing assembly relative to said extending arms.

2. The instrument of claim 1 wherein said end wall has an inner gauge surface carrying graduated measuring indicia for assessing turf height.

3. The instrument of claim 2 wherein said end wall further includes a beveled bottom edge.

4. The instrument of claim 3 wherein means for securing the position of said selectively adjustable viewing assembly relative to said extending arms comprises a turnbuckle assembly connecting said extending arms near said open end of said frame so as to permit binding of said selectively adjustable viewing assembly in a fixed position relative to said arms.

5. The instrument of claim 1 wherein said prism is a right angle prism configured such that the hypotenuse of said right angle prism slopes upward away from said end wall.

6. The instrument of claim 5 wherein said prism is tiltable up to about 10 degrees such that said hypotenuse is more vertically positioned when so tilted.

7. A method of assessing turf conditions, comprising the steps of:
    (a) providing an instrument comprising an end wall having a gauge surface carrying measuring indicia for assessing turf height, a selectively adjustable viewing assembly for movement relative to said gauge surface of said end wall, means for moveably carrying said selectively adjustable viewing assembly, and means for securing the position of said selectively adjustable viewing assembly relative to said means for moveably carrying said selectively adjustable viewing assembly;
    (b) setting said instrument upon the turf;
    (c) selectively adjusting said selectively adjustable viewing assembly relative to said end wall for observing the characteristics of the turf; and
    (d) observing the characteristics of the turf through said selectively adjustable viewing assembly.

8. The method of claim 7 further including the step of securing the position of said selectively adjustable viewing assembly relative to said means for moveably carrying said selectively adjustable viewing assembly.

* * * * *